G. A. ANDERSON.
CAR TRUCK.
APPLICATION FILED MAR. 30, 1921. RENEWED MAR. 17, 1922.
1,414,925.
Patented May 2, 1922.
2 SHEETS—SHEET 1.
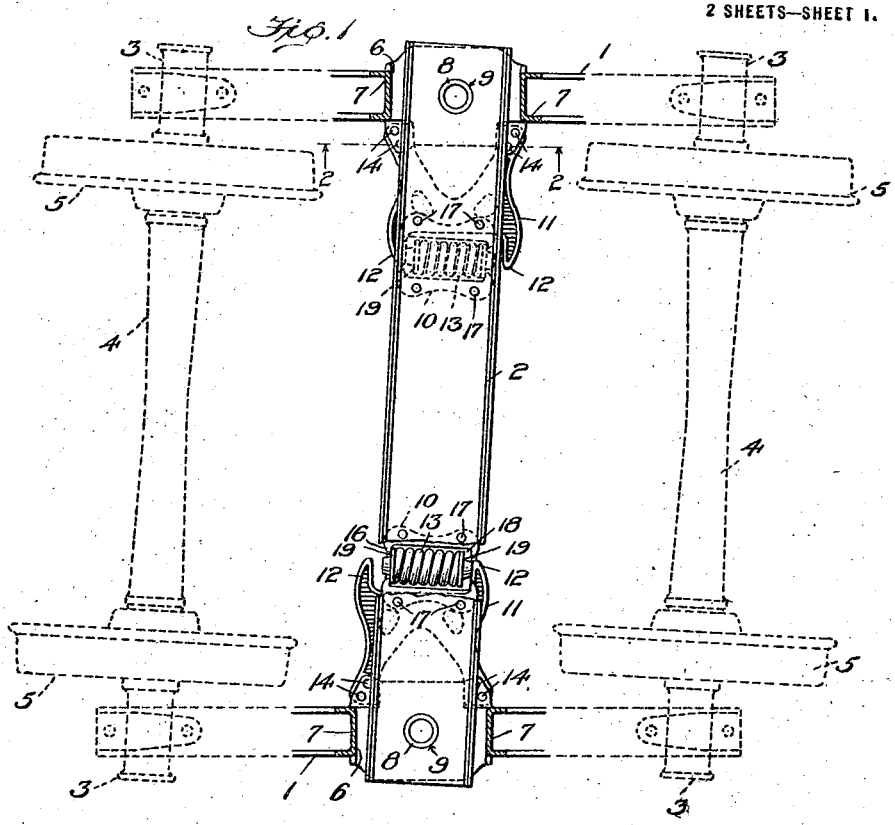
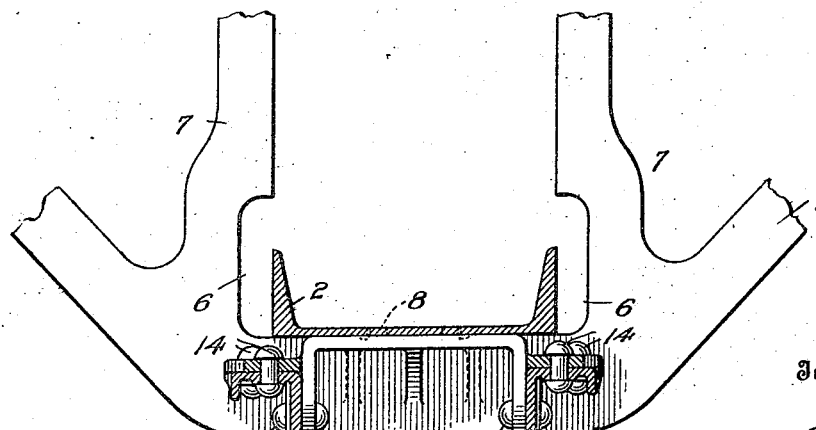

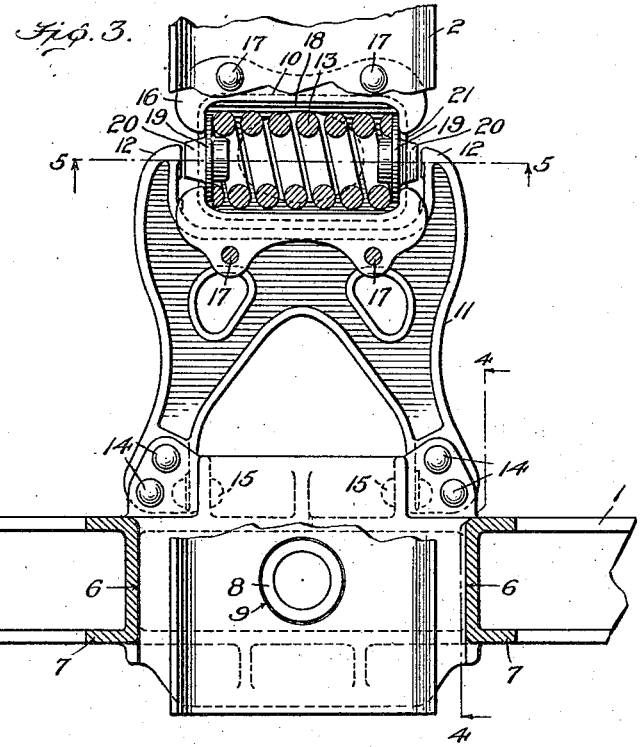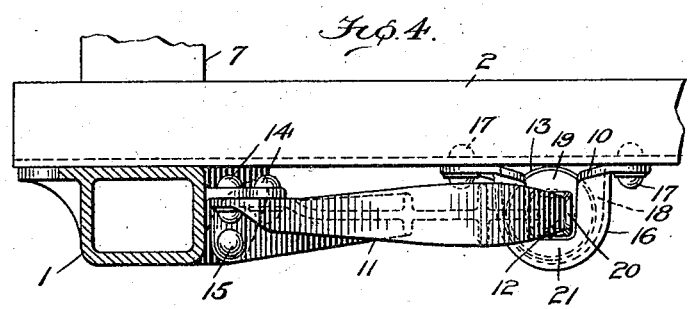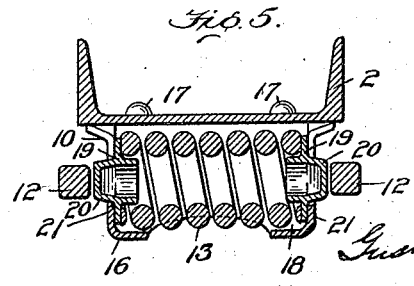

ered to make and use the same.
UNITED STATES PATENT OFFICE.

GUSTAF ARVID ANDERSON, OF BALTIMORE, MARYLAND, ASSIGNOR TO THE T. H. SYMINGTON COMPANY, OF NEW YORK, N. Y., A CORPORATION OF DELAWARE.

CAR TRUCK.

1,414,925.  Specification of Letters Patent.  Patented May 2, 1922.

Application filed March 30, 1921, Serial No. 456,851. Renewed March 17, 1922. Serial No. 544,692.

*To all whom it may concern:*

Be it known that I, GUSTAF ARVID ANDERSON, a citizen of the United States, residing at Baltimore, State of Maryland, have invented certain new and useful Improvements in Car Trucks; and I do hereby declare the following to be a full, clear, and exact description of the invention, such as will enable others skilled in the art to which it appertains to make and use the same.

The invention relates to flexible car trucks embodying transversely spaced side frame members which are capable of relative movement longitudinally of the truck, and more particularly concerns resilient means for resisting the displacement of the side frames from square relation and for restoring the truck parts to normal or square position following their displacement incident to the passage of the truck around curved portions of the track or over bad rail joints, defective switch points or other track inequalities.

The principal object of the invention, generally stated, is to provide a strong, compact and reliable mechanism for yieldingly resisting longitudinal movements of the side frames of a flexible car truck from their normal positions and for restoring said parts to square relation upon cessation of the distorting force. To this end I provide one or more double-acting spring devices which are preferably mounted upon the cross connecting member of the car truck and associate therewith means for energizing the respective spring devices whenever either of the truck side frames executes a longitudinal displacement in either direction from normal position, each of the said means for energizing the respective spring devices employed being adapted to energize the associated spring device by acting upon either end of the latter.

There are many useful features of my invention which reside in the various elements and combinations of elements hereinafter pointed out.

In the drawings illustrating the invention, the scope whereof is pointed out in the claims,—

Figure 1 is a view of a car truck, partly in plan and partly in horizontal section, embodying the invention, the truck bolster, which may be of the form ordinarily employed in flexible trucks, being omitted, the wheels and portions of the truck side frames being shown in dotted lines, and the parts being illustrated in an angular relation such as they assume when the truck passes around a curve.

Figure 2 is a detail sectional view on the line 2—2, Fig. 1.

Figure 3 is a detail view, partly in plan and partly in horizontal section, illustrating the normal relation of one of the truck side frame members to the cross connecting member of the truck and to the means by which said side frame members are yieldingly maintained in square relation, a portion of the said transverse connecting member being broken away.

Figure 4 is a section on the line 4—4, Fig. 3.

Figure 5 is a section on the line 5—5, Fig. 3.

In the embodiment of the invention illustrated in the drawings the spaced side frame members 1 of the truck are movably connected by transversely extending means 2 preferably constituting a truck spring plank. Each side frame is provided at its opposite ends with journal boxes (not shown) into which extend the journal ends 3 of axles 4 carrying truck wheels 5.

The member 2 by which the side frames 1 are connected across the truck preferably extends into the bolster openings 6 between the columns 7 of the side frames, sufficient space being provided between said columns to permit the cross connecting means to change its angular relation to the side frame members when the latter are displaced longitudinally of the truck from normal position. When, as illustrated in the drawings, a spring plank 2 performs the function of a cross connecting means, ample clearance should be similarly provided between the columns 7 and the sides of the bolster in order that the latter may freely change its angular relation to the side frame members 1 when the latter execute a relative longitudinal movement.

The spring plank 2 is pivotally connected at its ends to the adjacent side frame members, each of the latter being for this purpose formed with an upwardly extending pivot boss 8 which projects into a correspondingly shaped aperture or pivot bearing 9 in the spring plank.

The means for yieldingly resisting longitudinal displacement of the side frame members 1 from normal position preferably comprise a plurality of mechanisms each of which is associated with one of the side frames, but a single one of these mechanisms may be employed if desired, since the restoration of the cross connecting member 2 of the truck to normal position, whether its return to that position be induced by one or both of the controlling mechanisms, results in causing both side frames to reassume a square relation.

Each of the mechanisms for yieldingly resisting out-of-square displacements of the side frame members involves a spring device 10 carried by the spring plank 2 and means for energizing said spring devices when the side frame member with which it is associated moves in either direction longitudinally of the truck from its normal position, said means being preferably formed as an integral casting 11 having at its inner end spaced arms or jaws 12 which are adapted alternately to cooperate with the spring device 10 to effect the compression of the spring 13 of the latter. The member 11 which is arranged beneath the spring plank 2 is rigidly secured to the adjacent side frame member 1, preferably by means of rivets 14 and 15 which pass through suitable flanges with which the side frame and the member 11 are respectively provided. As shown, the member 11 may be made of skeleton form in order to decrease its weight.

Each of the spring devices 10 comprises a cage 16 which may be conveniently secured to the under side of the spring plank 2 by means of rivets 17. The cage 16 is formed with a spring receiving chamber 18 which extends transversely of the direction of length of the spring plank and which receives a coiled spring 13 as well as a plurality of followers 19 between which said spring is interposed. The springs 13 are preferably assembled in the spring pockets 18 of their respective cages under a considerable initial compression. The cage is open at each end of its spring chamber 19 so as to permit the spaced arms or jaws 12 of the member 11 to engage and move the followers and thereby effect the compression of the spring 13.

Each follower may be provided upon its outer face with a centrally disposed projection or raised portion 20 which extends through the opening in the end wall 21 of the cage against which the follower bears. These projections 20 of the followers are adapted to be engaged by the spaced arms 12, sufficient clearance being thus provided between said arms and the end walls 21 of the cage 10 to allow an extended compression of the spring 13 corresponding to a considerable longitudinal displacement of the adjacent side frame 1 from its normal position.

When either of the side frame members 1 is displaced longitudinally of the truck from its normal position the transverse connecting member or spring plank 2 changes its angular relation to said side frames. As a result of this change in the angular position of the spring plank one or the other of the spaced arms 12 of each of the members 11 forces the neighboring follower 12 from its seat upon the spring cage 10, while the follower at the other end of the spring 13 remains seated upon said cage. This movement of the followers toward each other causes the spring 13 which is between them to be energized, offering continually increasing resistance to the departure of the side frame members from normal relation. When the extraneous force acting upon the truck to induce relative longitudinal displacement of the side frame members from their normal position ceases to act, the springs 13 expand and by pressing against the members 11 cause the side frames to be returned to square position. If the truck side frames 1 are forced out of square in the opposite direction the operation is precisely the same except that the springs 13 are energized from their opposite ends by the other arms or projections 12 of the members 11 carried by the side frames.

I claim :—

1. In a car truck, the combination with side frame members which are relatively movable longitudinally of the truck, of means for pivotally connecting said side frame members, a spring carried by said connecting means, and means rigid with one of said side frame members for energizing said spring upon a longitudinal displacement of said side frame member in either direction from normal position.

2. In a car truck, the combination with side frame members which are relatively movable longitudinally of the truck, of means for movably connecting said side frame members, a spring mounted upon said connecting means and adapted to be energized in a direction extending at an angle to the direction of length of said connecting means, and means connected to one of said side frame members for energizing said spring from one end when said side frame member is displaced longitudinally of the truck in one direction from normal position and for energizing said spring from its opposite end when said frame member is displaced longitudinally of the truck from normal position in the opposite direction.

3. In a car truck, the combination with side frame members which are relatively movable longitudinally of the truck, of means extending transversely of the truck for connecting said side frame members, a spring device mounted upon said connecting means adjacent one of said side frame members, and a spring actuating member connected to said adjacent side frame member and extending inwardly therefrom and adapted to overlie the end portions of said spring device for energizing said spring device upon a displacement of said spring actuating member longitudinally of the truck from normal position.

4. In a car truck, the combination with side frame members which are relatively movable longitudinally of the truck, of a transversely extending member for connecting said side frame members, a spring device mounted upon said connecting member and depending therefrom, and means rigidly connected to one of said side frame members and adapted alternately to engage the opposite ends of said spring device to energize the same upon longitudinal displacement of said frame member in opposite directions from normal position.

5. In a car truck, the combination with side frame members which are relatively movable longitudinally of the truck, of a spring plank pivotally connected at its opposite ends to said side frame members, a plurality of transversely arranged spring devices carried by said spring plank, and means connected to said side frame members for energizing said springs upon a relative longitudinal displacement of said side frame members from normal position, said means being adapted to overlie the opposite ends of the said spring devices.

6. In a car truck, the combination with side frame members which are relatively movable longitudinally of the truck, of a spring plank pivotally connected to said side frame members, spring cages carried by said spring plank, spring devices within said spring cages, and means extending inwardly from the respective side frame members for dissimultaneously energizing each of said spring devices from opposite ends upon a relative longitudinal displacement of said side frame members from normal position.

7. In a car truck, the combination with side frame members which are relatively movable longitudinally of the truck, of means for movably connecting said side frame members, spring means, and means for energizing said spring means upon a relative longitudinal displacement of said side frame members in either direction from normal position, said last named means involving a member rigidly attached to one of said side frame members and having spaced portions between which said spring means extends and by which said spring means is adapted to be energized.

8. In a car truck, the combination with side frame members which are relatively movable longitudinally of the truck, of means for movably connecting said side frame members, spring means, and means for energizing said spring means upon a relative longitudinal displacement of said side frame members in either direction from normal position, said spring means being connected to and arranged beneath said connecting means, and said means for energizing said spring means involving a member rigidly attached to one of said side frame members and extending beneath said connecting means and having spaced portions either of which is adapted to energize said spring means.

9. In a car truck, the combination with side frame members which are relatively movable longitudinally of the truck, of a spring plank pivotally connected to said side frame members, a spring cage mounted upon said spring plank, a plurality of followers adapted to be seated upon said cage, a spring interposed between said followers, and a member rigidly attached to one of said side frame members and having spaced arms between which said spring and followers are received, each of said spaced arms being adapted to actuate a corresponding one of said followers.

In testimony whereof I affix my signature.

GUSTAF ARVID ANDERSON.